United States Patent [19]

Hemp et al.

[11] 4,050,303
[45] Sept. 27, 1977

[54] FLUID FLOW METERS

[75] Inventors: John Hemp, Marston; Derek Gerald Wyatt, Oxford, both of England

[73] Assignee: National Research Development Corporation, London, England

[21] Appl. No.: 690,784

[22] Filed: May 27, 1976

[30] Foreign Application Priority Data

May 27, 1975 United Kingdom ............... 23179/75

[51] Int. Cl.² .................................................. G01F 1/58
[52] U.S. Cl. ............................................... 73/194 EM
[58] Field of Search ............................... 73/194 EM

[56] References Cited

U.S. PATENT DOCUMENTS

| | | | |
|---|---|---|---|
| 3,373,608 | 3/1968 | Ketelsen | 73/194 EM |
| 3,566,687 | 3/1971 | Mittelmann | 73/194 EM |
| 3,589,186 | 6/1971 | Bourg | 73/194 EM |
| 3,924,466 | 12/1975 | Medlar | 73/194 EM |

Primary Examiner—Charles A. Ruehl
Attorney, Agent, or Firm—Cushman, Darby & Cushman

[57] ABSTRACT

An electromagnetic flowmeter comprises an iron tube surrounding a non-magnetic electrically insulating tube through which the fluid flows. Windings formed by printed circuit conductors are located on the inner surface of the iron tube and produce a main magnetic field in one direction in the electrode plane and subsidiary magnetic fields in the opposite direction upstream and downstream of the electrode plane.

5 Claims, 6 Drawing Figures

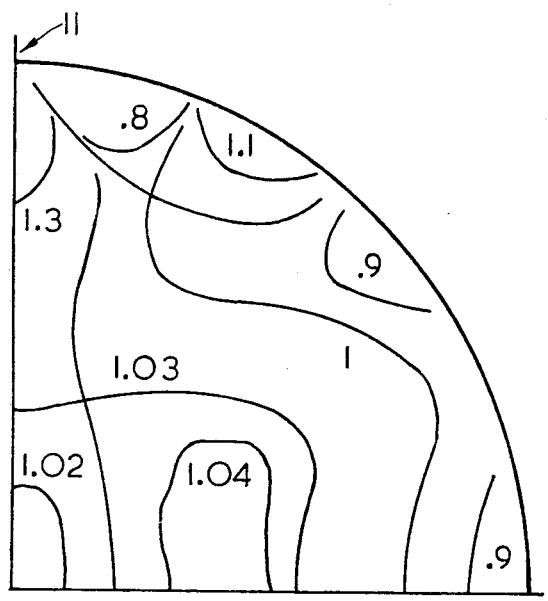
-FIG. 4.-
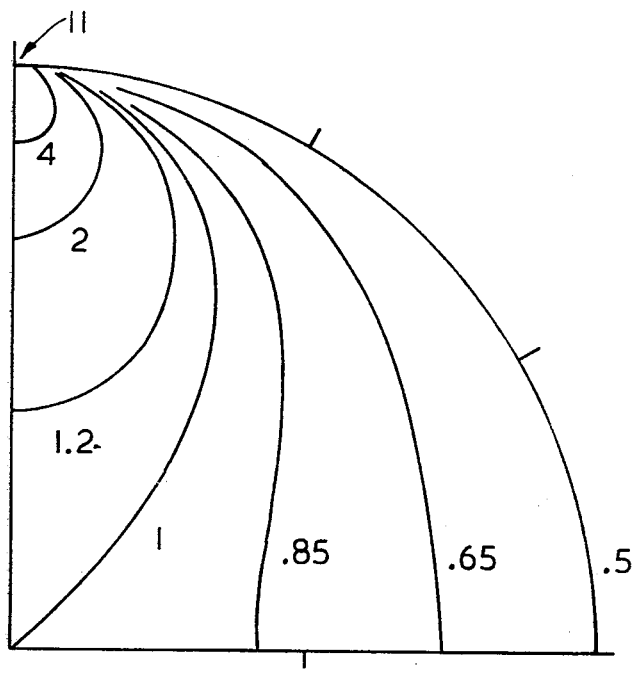
-FIG. 5.-

FLUID FLOW METERS

FIELD OF THE INVENTION

This invention relates to electromagnetic flowmeters and more particularly to flowmeters having point electrodes.

BACKGROUND OF THE INVENTION

With all flowmeters in which electrodes are required to make electrical contact with a fluid in the flowmeter, there exists a problem of ensuring that the contact resistance between the electrodes and the fluid is uniform. Variation in contact resistance can be caused by deposition of solid matter suspended in the fluid, by the appearance of gas bubbles and by chemical action. It has been found that this problem can largely be avoided by using electrodes which are small enough to be regarded as points. However, flowmeters having point electrodes suffer from the disadvantage that they are over-sensitive to flow near the electrodes so that the calibration of the flowmeter is seriously affected by variations in the velocity profile of fluids flowing therethrough. The present invention is concerned with the provision of an electromagnetic flowmeter having a magnetic field which varies in such a manner as to reduce this disadvantage.

SUMMARY OF THE INVENTION

According to the invention, there is provided an electromagnetic flowmeter for measuring the rate of fluid flow in a duct of circular cross-section, comprising a pair of electrodes disposed at diametrically opposed positions on the duct, main winding means for producing a main magnetic field in the duct extending transversely between the electrodes to establish a signal across the electrodes, and first, second, third and fourth subsidiary winding means spaced around the main winding means for producing respective subsidiary magnetic fields having components parallel to but in the opposite direction to the main magnetic field in the duct, the first and second subsidiary magnetic fields each being disposed adjacent to a respective electrode upstream thereof and the third and fourth subsidiary magnetic fields each being disposed adjacent to a respective electrode downstream thereof.

It should be understood that the term "winding means" as used herein includes any arrangement of electrical conductors forming or simulating a substantially closed loop so that, when an electrical current flows in such conductors, a magnetic field extending through such loop is produced. The winding means may comprise one or more substantially closed loops of printed conductor on a surface as well as wound coils.

In a preferred form of the invention, two further winding means are provided for producing further respective magnetic fields each disposed adjacent to a respective electrode between the corresponding subsidiary magnetic fields, the further magnetic fields having components in the duct in the same direction as the main magnetic field.

When designing a printed circuit to serve as the winding means for an electromagnetic flowmeter in accordance with the invention, the form of the winding means is preferably so arranged as to minimize the dependence of the sensitivity of the flowmeter on velocity profile while limiting the power requirement of the windings. The windings consist of thin conducting strips laid in a bounded geometrical surface at least partially surrounding the duct. The distribution of conducting strips and the currents arranged to pass through each strip are determined by expressing the magnetic potential on the surface as a general Fourier series in two coordinates defining the position of a point on the surface. The series is terminated after a predetermined number of terms in accordance with the required accuracy. The response of the flowmeter to rectilinear flow (i.e. flow which is everywhere parallel to the direction of the duct) at any point to the cross-section of the duct, hereinafter referred to as the weight function, is computed in terms of the coefficients of the terms in the Fourier series and the known geometry of the electrode system. The coefficients of the terms in the Fourier series are determined using a numerical technique by minimizing the root mean square deviation of the weight function divided by the mean weight function, the minimization being carried out over specified points in the cross-section of the duct. The minimization is carried out under a constraint on a quantity equal to the ratio of the square of the sensitivity for a fixed distribution of fluid velocity divided by the corresponding power dissipated in the conducting strips. The fixed distribution of fluid velocity may be assumed to be a uniform distribution. When the coefficients are determined, the distribution of conducting strips is chosen so that the edges of the strips are coincident with lines of constant magnetic potential difference. The current density in each strip is made proportional to the change in magnetic potential difference across the width of the strip. The density of the strips is made large enough to reproduce the required magnetic potential difference accurately enough over the surface. This design-procedure is more fully described in J. Hemp, "Improved magnetic field for an electromagnetic flowmeter with point electrodes" J. Phys. D: App. Phys., Vol. 8, 1975, Page 983.

BRIEF DESCRIPTION OF THE DRAWINGS

Embodiments of the invention will now be described by way of example with reference to the accompanying drawings in which:

FIG. 4 is a diagram showing the weighting functions obtained with the flowmeter shown in FIGS. 1 to 3, FIG. 5 is a diagram of the weighting functions obtained with a similar flowmeter having a uniform magnetic field.

DESCRIPTION OF THE PREFERRED EMBODIMENT

Figure 1:
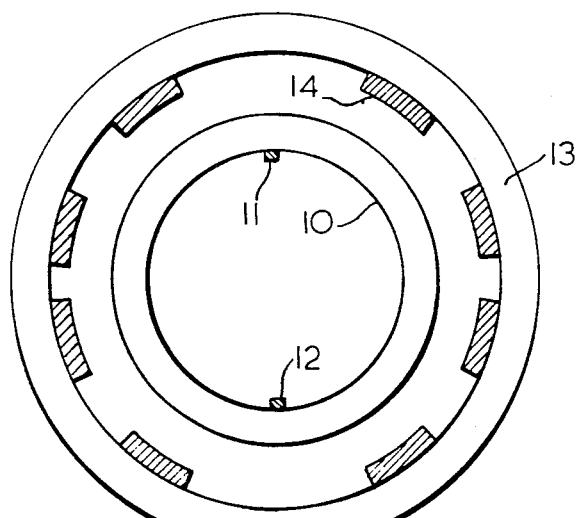
FIG. 1 is a transverse cross-sectional view of a flowmeter in accordance with the invention with the location of the windings shown schematically.

Referring to FIG. 1, a flowmeter in accordance with the invention consists of an electrically insulating non-conductive tube 10 containing a pair of diametrically opposed point electrodes 11 and 12. The tube 10 is enclosed within an iron tube 13 having copper strips such as the strip 14 desposited on its inner surface to form windings. The copper strips are, of course, electrically insulated from the iron tube. The windings are arranged to produce a magnetic field in the tube 10 having its principal component directed perpendicular both to the longitudinal axis of the tube 10 and the axis of the electrodes 11 and 12.

Figure 2:
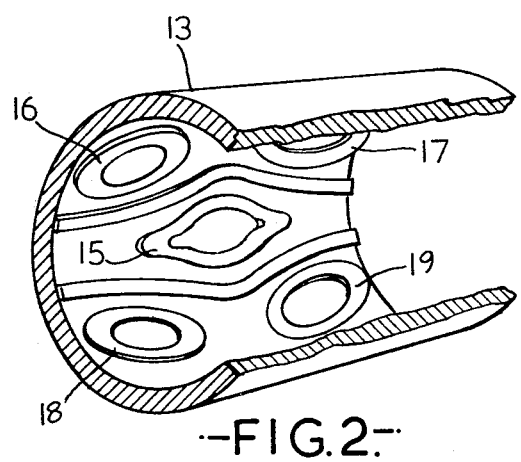
FIG. 2 is a broken away perspective view of the flowmeter shown in FIG. 1 with the duct and electrodes removed.

Referring to FIG. 2, the axial length of the iron tube 13 is about two and a half times the diameter of the tube 10. As mentioned above, the disposition of the copper strips forming the windings is shown schematically but it can be seen that the windings provide a central loop 15 having its axis perpendicular to the axis of the electrodes (FIG. 1), and four surrounding loops, 16, 17, 18 and 19. In use, the loop 15 provides the main magnetic field and current flows in the loops 16, 17, 18 and 19 in the opposite direction to the current flowing in the loop 15 to provide subsidiary magnetic fields in the opposite direction to the main magnetic field in the vicinity of the electrodes 11 and 12.

Figure 3:
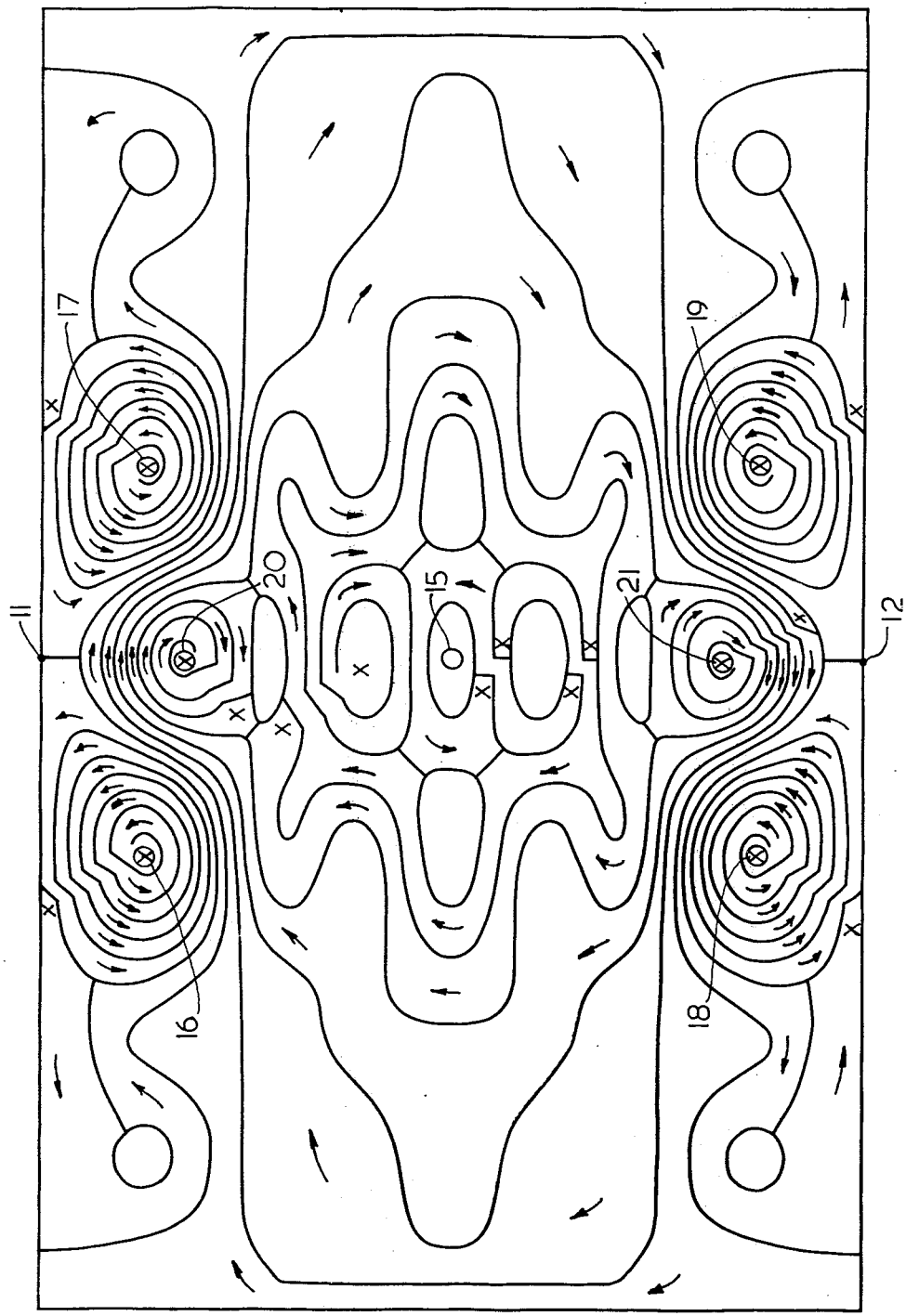
FIG. 3 is a developed plan view of the windings of the flowmeter shown in FIGS. 1 and 2.

FIG. 3 is a developed view of the actual layout of the copper strips forming the windings. These are produced by a printed circuit technique, the black lines indicating insulation between adjacent areas of copper. The windings are energized from an alternating current supply, the instantaneous directions of current flow being indicated by arrows. Electrical connections to the copper strips are made at the points marked x. It will be seen that the various windings are formed from concentric current paths, adjacent paths being connected to one another to form a spiral. In order to avoid distorting the magnetic field, the leads supplying the center connections of the various windings are each disposed in close proximity to their respective windings in alignment with the location at which adjacent concentric rings are interconnected so as to balance out any magnetic field due to radial current flow. The corresponding return conductor is, of course, connected to the outer end of each spiral and the supply and return conductors are thereafter disposed in close proximity to one another so as to produce minimal net magnetic field.

The positions of the electrodes 11 and 12 are shown in FIG. 3 in order to indicate their orientation relative to the conductors. The electrodes are, of course, disposed on the inner tube 10 and not the outer iron tube 13. Preferably the diameter of each electrode is not greater than 5% of the radius of the inner tube 10 and the actual positions of the electrodes do not differ from their ideal positions, as indicated in FIG. 3, by more than 1% of the radius of the tube 10.

In FIG. 3 the reference numerals of the various windings denote the approximate centers of the windings which are marked o. In the central winding 15, the instantanious current flow direction is shown as clockwise (except in the center of the winding). This winding is surrounded by the four subsidiary windings 16, 17, 18 and 19 which are formed from copper strips of narrower width and have the instantaneous current shown as flowing in the anti-clockwise direction. In addition, there are two further windings 20 and 21 with the instantaneous current shown as flowing in the clockwise direction between the windings corresponding to the windings 16 and 17 and the windings corresponding to the windings 18 and 19 respectively. All the windings are connected in series so that the currents in all the strips are equal.

It should be understood that there are identical windings to those shown in FIG. 3 formed on the other side of the flowmeter but the currents flowing in the opposite directions so as to produce reinforcing magnetic fields.

Thus, the magnetic field produced by the main winding 15 is modified in the vicinity of the electrodes 11 and 12. The modification takes the form of reversing the field slightly upstream and slightly downstream of the electrodes but reinforcing it in the immediate vicinity of the transverse plane containing the electrodes.

FIG. 4 is a diagram showing the weighting function in a quadrant of the transverse plane containing the electrodes, the weighting functions in the other three quadrants being similar. FIG. 5 is a corresponding diagram showing the weighting functions which would have been obtained with a uniform magnetic field. It can be seen that the weighting function in the vicinity of the electrode 11, at the top of the diagram is considerably closer to unity (the mean value) in FIG. 4 than in FIG. 5.

Figure 6:
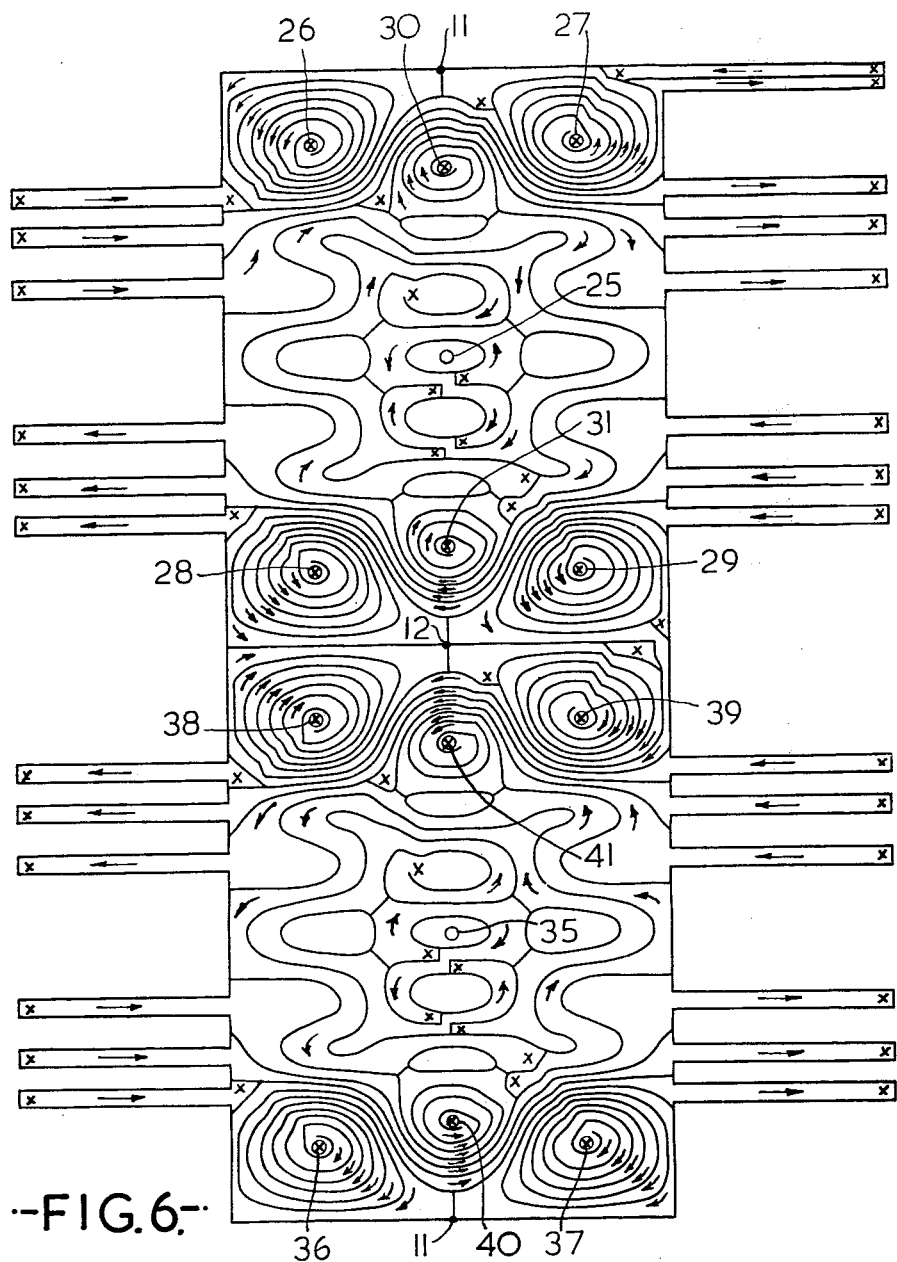
FIG. 6 is a developed plan view of an alternative winding configuration to that shown in FIG. 3.

FIG. 6 is a developed view of the copper strips forming the windings of an alternative flowmeter in accordance with the invention. The whole of the winding is shown instead of only half as was the case in FIG. 3. The physical construction is similar to that of the flowmeter shown in FIGS. 1 to 3 except that the axial length of the iron tube within which the windings are located is approximately equal to its diameter, the side connections to the circuit being folded back round the outside of the iron tube. The windings 25 to 31 in one half and the windings 35 to 41 in the other half correspond to the windings 15 to 21 of FIG. 3. The deviations of the resulting magnetic field distribution from the desired distribution is slightly larger than for the windings shown in FIG. 3 but, for many applications, the shorter axial length of the flowmeter outweighs this disadvantage. As before, electrical connections to the copper strips are made at the points marked x and the various parts of the windings are connected in series so that the relative direction of current flow is as indicated by the arrows. The positions of the electrodes 11 and 12 are shown to illustrate their orientation, the electrode 11 being shown at both ends of the developed view.

We claim:

1. An electromagnetic flowmeter for measuring the rate of fluid flow in a duct of circular cross-section, comprising a pair of electrodes disposed at diametrically opposed positions on the duct, main winding means for producing a main magnetic field in the duct extending transversely between the electrodes to establish a signal across the electrodes, and first, second, third and fourth subsidiary winding means spaced around the main winding means for producing respective subsidiary magnetic fields having components parallel to but in the opposite direction to the main magnetic field in the duct, the first and second subsidiary (magnetic fields) winding means each being disposed adjacent to a respective electrode upstream thereof and the third and fourth subsidiary (magnetic fields) winding means each being disposed adjacent to a respective electrode downstream thereof.

2. A flowmeter according the claim 1, including two further winding means each disposed adjacent to a respective electrode between the corresponding subsidiary winding means arranged to produce further magnetic fields having components in the duct in the same direction as the main magnetic field.

3. A flowmeter according to claim 1, wherein each winding means comprises at least one substantially closed loop of electrically conductive strip (on an insulating surface).

4. A flowmeter according to claim 3, wherein the conductive strips are so arranged that the edge of the strips are coincident with lines of constant magnetic potential difference in the required magnetic field and the current density of each strip is proportional to the change in the required magnetic potential difference thereacross.

5. A flowmeter according to claim 3, wherein the winding means are located on the inner surface of a ferromagnetic tube.

* * * * *